United States Patent
Levene et al.

(10) Patent No.: US 8,981,311 B2
(45) Date of Patent: Mar. 17, 2015

(54) CT DETECTOR INCLUDING MULTI-LAYER FLUORESCENT TAPE SCINTILLATOR WITH SWITCHABLE SPECTRAL SENSITIVITY

(75) Inventors: Simha Levene, D. N. Hanegev (IL); Naor Wainer, Zichron Yaakov (IL); Amiaz Altman, Tel Aviv (IL); Rafael Goshen, Haifa (IL); Cornelis Reinder Ronda, Aachen (DE)

(73) Assignee: Koninklijke Philips N.V., Eindhoven (NL)

( * ) Notice: Subject to any disclaimer, the term of this patent is extended or adjusted under 35 U.S.C. 154(b) by 361 days.

(21) Appl. No.: 13/696,136

(22) PCT Filed: Apr. 25, 2011

(86) PCT No.: PCT/IB2011/051791
§ 371 (c)(1),
(2), (4) Date: Nov. 5, 2012

(87) PCT Pub. No.: WO2011/148276
PCT Pub. Date: Dec. 1, 2011

(65) Prior Publication Data
US 2013/0058452 A1 Mar. 7, 2013

Related U.S. Application Data

(60) Provisional application No. 61/347,529, filed on May 24, 2010.

(51) Int. Cl.
G01T 1/20 (2006.01)
G01T 1/29 (2006.01)

(52) U.S. Cl.
CPC .............. *G01T 1/2018* (2013.01); *G01T 1/2985* (2013.01)
USPC .......................... 250/370.11; 250/366; 378/19

(58) Field of Classification Search
CPC .... G01T 1/2018; G01T 1/1644; G01T 1/2002
USPC ................................ 250/366, 370.11; 378/19
See application file for complete search history.

(56) References Cited

U.S. PATENT DOCUMENTS 7,358,506 B2  4/2008 Daniel
7,368,718 B2  5/2008 Freund et al.
(Continued)

FOREIGN PATENT DOCUMENTS

EP  1460643 A1  9/2004
EP  1681584 A2  7/2006
(Continued)

OTHER PUBLICATIONS

Barbender Food Extruders for laboratories and simulation; 2005; Barbender GmbH & Co. KG; pp. 4.
(Continued)

*Primary Examiner* — Michael Maskell

(57) ABSTRACT

A scintillator element (114) comprising uncured scintillator material (112) is formed and optically cured to generate a cured scintillator element (122, 122″). The uncured scintillator material suitably combines at least a scintillator material powder and an uncured polymeric host. In a reel to reel process, a flexible array of optical detectors is transferred from a source reel (100) to a take-up reel (106) and the uncured scintillator material (112) is disposed on the flexible array and optically cured during said transfer. Such detector layers (31, 32, 33, 34, 35) are stackable to define a multi-layer computed tomography (CT) detector array (20). Detector element channels (50, 50′, 50″) include a preamplifier (52) and switching circuitry (54, 54′, 54″) having a first mode connecting the preamplifier with at least first detector array layers (31, 32) and a second mode connecting the preamplifier with at least second detector array layers (33, 34, 35).

29 Claims, 10 Drawing Sheets

(56) References Cited

U.S. PATENT DOCUMENTS

| | | |
|---|---|---|
| 7,375,341 B1 | 5/2008 | Nagarkar et al. |
| 7,554,087 B2 | 6/2009 | Kondo et al. |
| 2003/0203621 A1 | 10/2003 | Jeans et al. |
| 2008/0210877 A1 | 9/2008 | Altman et al. |
| 2008/0253507 A1 | 10/2008 | Levene et al. |
| 2010/0032578 A1 | 2/2010 | Levene et al. |
| 2010/0296625 A1* | 11/2010 | Wainer et al. ............ 378/19 |
| 2012/0153163 A1* | 6/2012 | Levene et al. ............ 250/361 R |

FOREIGN PATENT DOCUMENTS

| | | |
|---|---|---|
| WO | 2006046163 A1 | 5/2006 |
| WO | 2006114715 A2 | 11/2006 |
| WO | 2006114716 A2 | 11/2006 |
| WO | 2007083248 A1 | 7/2007 |
| WO | 2008132634 A2 | 11/2008 |
| WO | 2009060340 A2 | 5/2009 |
| WO | 2009083852 A2 | 7/2009 |
| WO | 2010015955 A2 | 2/2010 |

OTHER PUBLICATIONS

"Spectral CT paper awarded PMB prize" 2009; Medical Physics Web; http://medicalphysicsweb.org/cws/article/research/39907.

Philips Products "Spectral CT" Koninklijke Philips Electronics N.V.; Oct. 24, 2012; http://healthcare.philips.com/us_en/products/index . . . .

* cited by examiner

CT DETECTOR INCLUDING MULTI-LAYER FLUORESCENT TAPE SCINTILLATOR WITH SWITCHABLE SPECTRAL SENSITIVITY

CROSS REFERENCE TO RELATED APPLICATIONS

This application claims the benefit of U.S. provisional application Ser. No. 61/347,529 filed May 24, 2010, which is incorporated herein by reference.

The following relates to the computed tomography (CT) imaging arts, spectral CT arts, radiation detector arts, and related arts.

To facilitate the use of computed tomography (CT) imaging systems in medical imaging, veterinary imaging, baggage handling, examination of mummies or other archaeological artifacts, or other applications, it is advantageous to provide enhanced imaging capabilities at reduced manufacturing cost. For example, spectral CT provides energy discriminative imaging data collection that can be exploited to differentiate between different materials in the subject. Some illustrative publications relating to detector arrays suitable for use in spectral CT include, Levene et al., WO 2006/114715 A2 published Nov. 2, 2006, and Altman et al., U.S. Pub. No. 2008/0210877 A1 published Sep. 4, 2008, both of which are incorporated herein by reference in their entireties.

Detector arrays for use in spectral or other CT generally comprise scintillators which absorb the incident x-rays, optically coupled to photodiodes which absorb the light they emit. One approach for reducing the scintillator cost is to use a powdered scintillator disposed in a host resin, as disclosed by way of example in Levene et al., WO 2009/083852 A2 published Jul. 9, 2009 and incorporated herein by reference in its entirety. As another example, Levene et al., U.S. Pat. No. 2010/0032578 discloses the use of a photo-resist resin as host resin, applied using known microelectronics mass production processes.

The following provides new and improved apparatuses and methods as disclosed herein.

In accordance with one disclosed aspect, a method of manufacturing comprises forming a scintillator element comprising uncured scintillator material, and optically curing the scintillator element comprising the uncured scintillator material to generate a scintillator element comprising cured scintillator material. The method of manufacturing optionally further comprises forming the uncured scintillator material by combining a scintillator material powder and an uncured polymeric host, and optionally by further combining a surfactant. Optionally, the scintillator element comprising uncured scintillator material is formed by disposing a layer of the uncured scintillator material on an array of optical detectors. Optionally, the array of optical detectors is a flexible array of optical detectors and the method further comprises performing a reel to reel process in which the flexible array of optical detectors is transferred from a source reel to a take up reel, wherein the layer of the uncured scintillator material is disposed on the flexible array of optical detectors during said transfer, and wherein the optical curing is performed during said transfer.

In accordance with another disclosed aspect, the method of manufacturing as set forth in the immediately preceding paragraph is repeated to generate a plurality of scintillator elements each comprising cured scintillator material, and the method further comprises stacking the scintillator elements and intervening arrays of optical detectors to define a multi-layer computed tomography (CT) detector array.

In accordance with another disclosed aspect, the method of manufacturing as set forth in the immediately preceding paragraph further includes electrically connecting a first sub-set of the CT detector array layers with a first electrical input path to spectral CT detector electronics, and electrically connecting a second sub-set of the CT detector array layers with a second electrical input path to the spectral CT detector electronics, wherein the spectral CT detector electronics have at least (i) a first operational mode in which the spectral CT detector electronics are operatively connected with at least the first electrical input path and (ii) a second operational mode in which the spectral CT detector electronics are operatively connected with at least the second electrical input path.

In accordance with another disclosed aspect, a computed tomography (CT) detector array comprises: a stack of detector array layers comprising a first sub-set of detector array layers having a first spectral response and a second sub-set of detector array layers having a second spectral response different from the first spectral response; and detector element channels each including a preamplifier and switching circuitry having (i) a first operational mode in which the preamplifier is operatively connected with at least detector elements of the first sub-set of detector array layers and (ii) a second operational mode in which the preamplifier is operatively connected with at least detector elements of the second sub-set of detector array layers.

In accordance with another disclosed aspect, a computed tomography (CT) system comprises: a CT detector array as set forth in the immediately preceding paragraph; a CT controller configured to acquire (1) first CT imaging data using the CT detector array operating in the first operational mode and (2) second CT imaging data using the CT detector array operating in the second operational mode; and a spectral CT image reconstruction module configured to generate one or more CT images containing spectral information based on the first CT imaging data and the second CT imaging data.

One advantage resides in providing CT detectors at reduced manufacturing cost.

Another advantage resides in providing spectral CT imaging capability at substantially reduced manufacturing cost.

Further advantages will be apparent to those of ordinary skill in the art upon reading and understanding the following detailed description.

FIG. 1 diagrammatically illustrates a spectral CT imaging system employing a CT detector as disclosed herein.

FIGS. 2-4 diagrammatically illustrate alternative CT switch configurations for the CT detector of FIG. 1.

Figure 11:
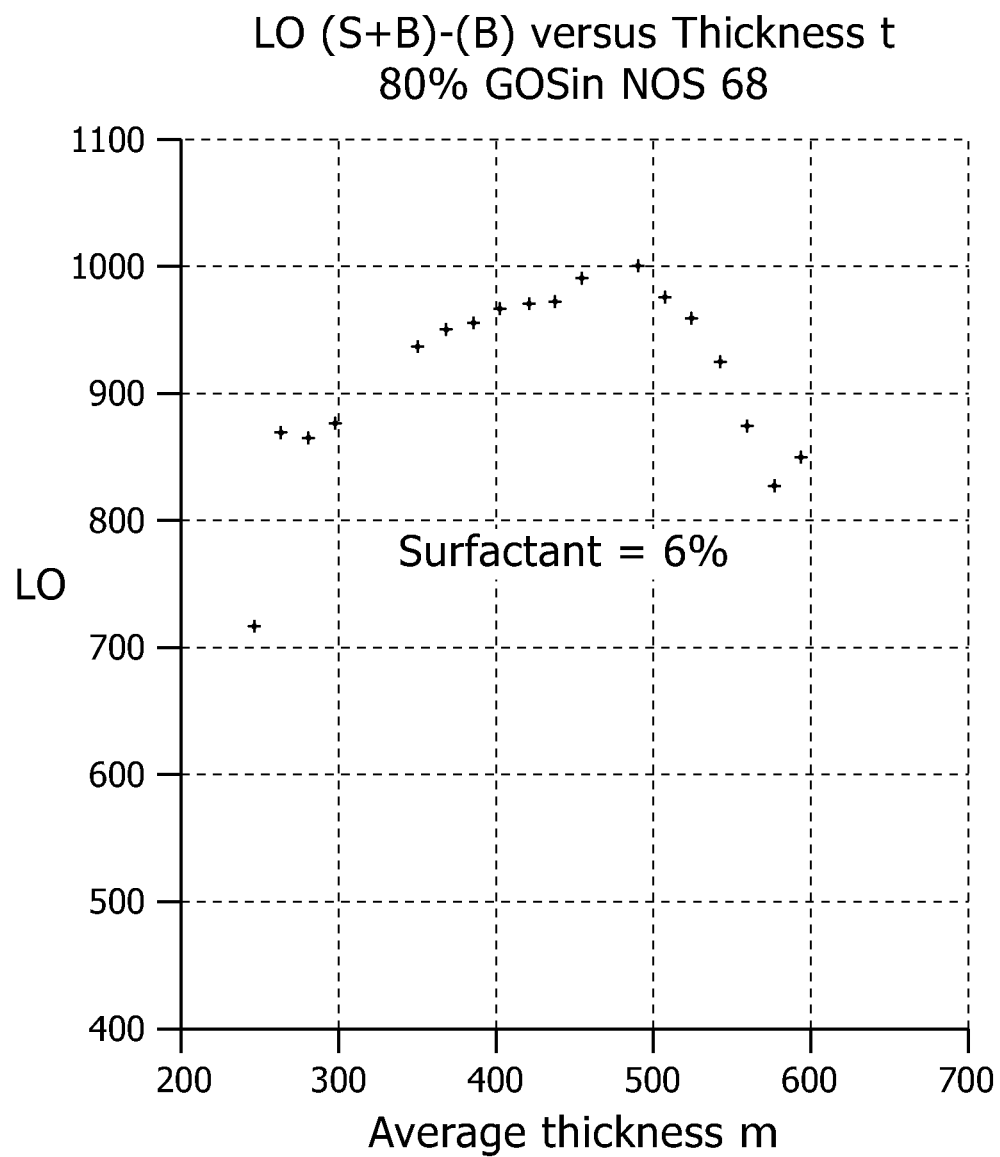

FIG. 11 plots experimental data for various thicknesses of a scintillator layer comprising cured scintillator material fabricated using 80 wt-% GOS scintillator powder in Norland Optical Adhesives Mercaptan resin (NOA 68) with 6 wt-% surfactant.

Figure 1:
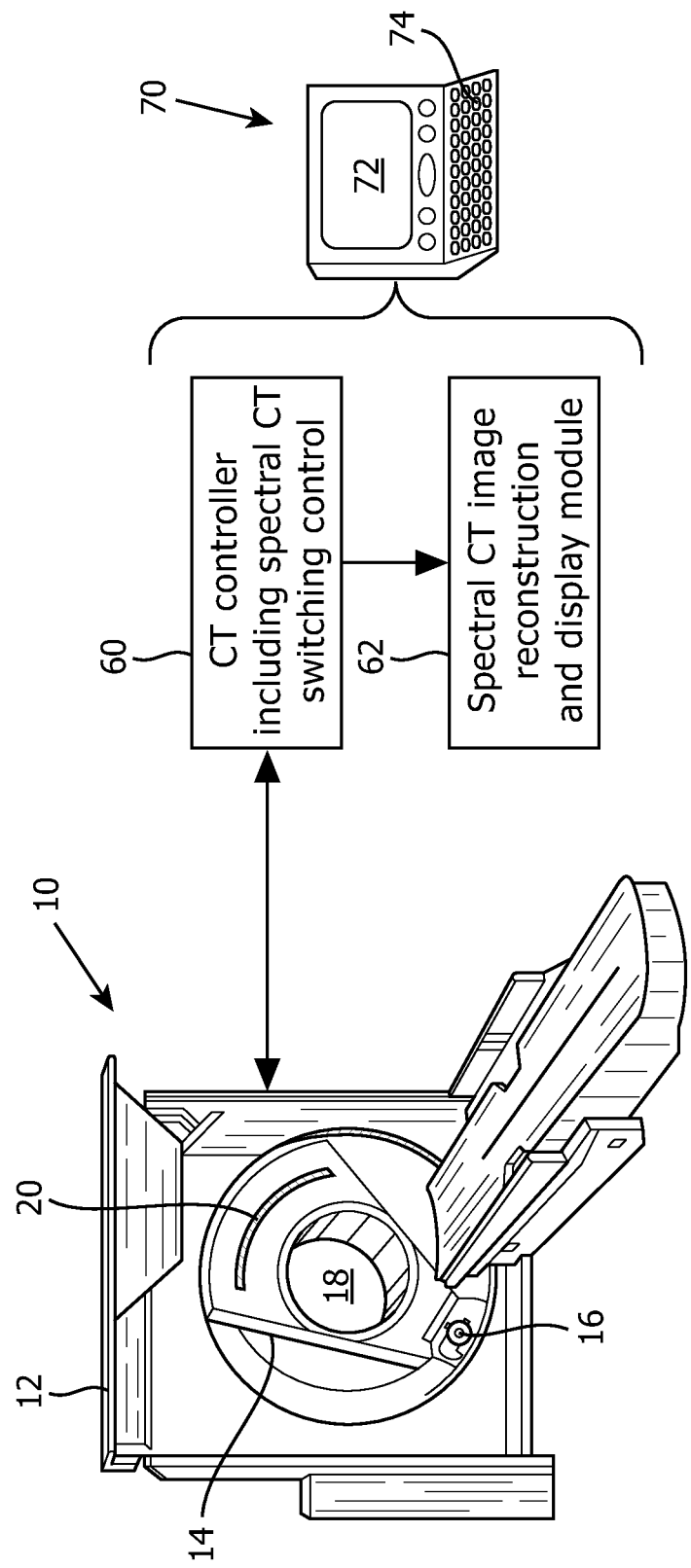

With reference to FIG. 1, a computed tomography (CT) scanner 10 includes a stationary support or housing 12 supporting a rotating assembly 14 that includes an x-ray tube 16 arranged to project x-rays into an imaging region 18. By rotating the rotating assembly 14 the x-ray tube successively projects x-rays into the imaging region 18 over a 360° span of projection views for each rotation. The rotating assembly 14 also includes a CT detector 20 that revolves around the imaging region 18 with the x-ray tube 16 and is arranged distally across the imaging region 18 from the x-ray tube 16 to detect x-rays after projection through the imaging region 18. The CT detector 20 has an arcuate span focused on the x-ray tube 16 and sized to capture the projected x-ray beam, which may in general have a cone-beam, fan-beam, or other beam geometry.

In an alternative embodiment (not illustrated), the CT detector may comprise a stationary annular detector surrounding the imaging region. In this alternative embodiment, the x-ray tube revolves around the imaging region as in the case of the CT scanner 10 shown in FIG. 1, and the complete annulus of the CT detector ensures that a full 360° span of projection views are collected by the CT detector.

Figure 2:
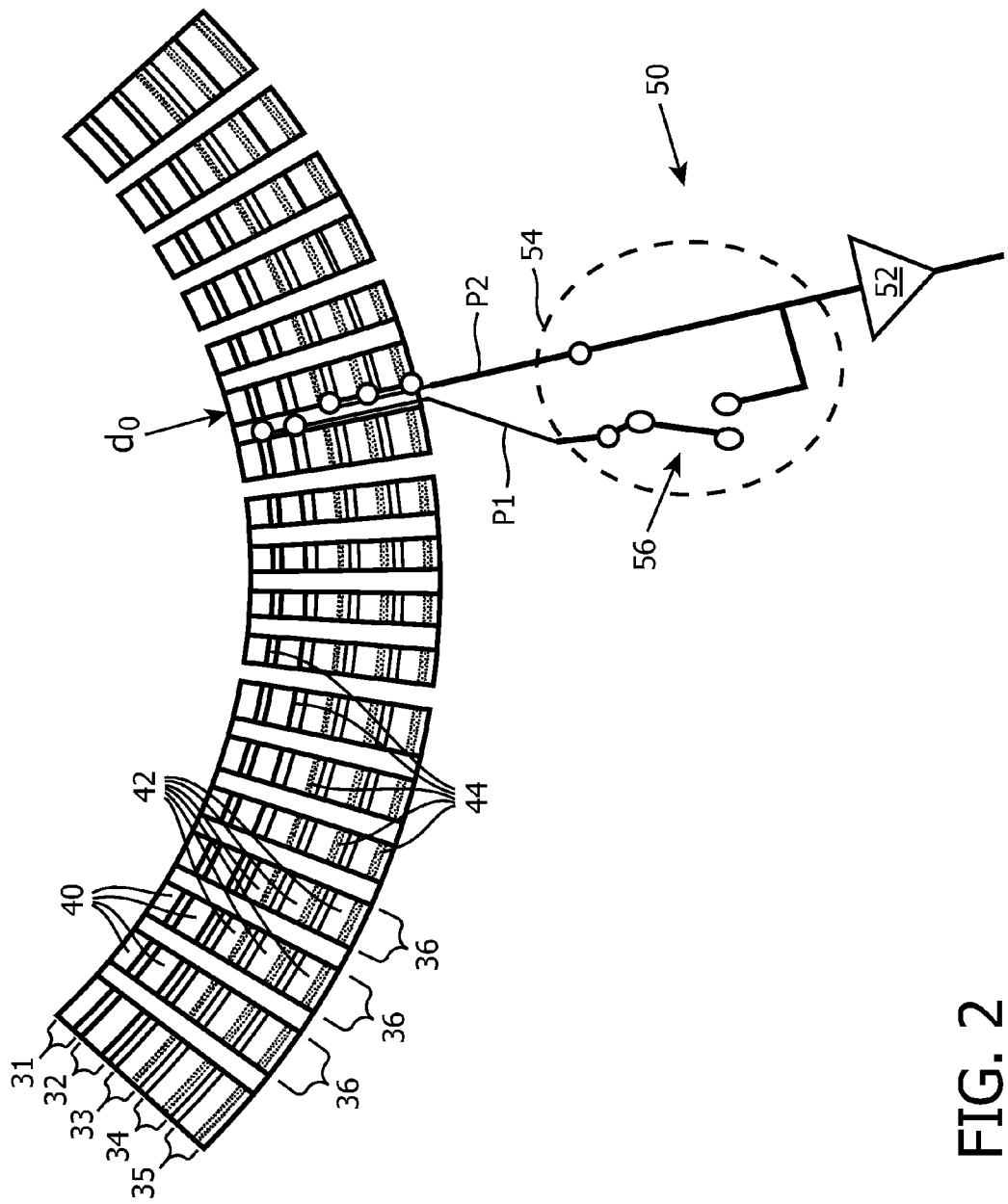
Figure 3:
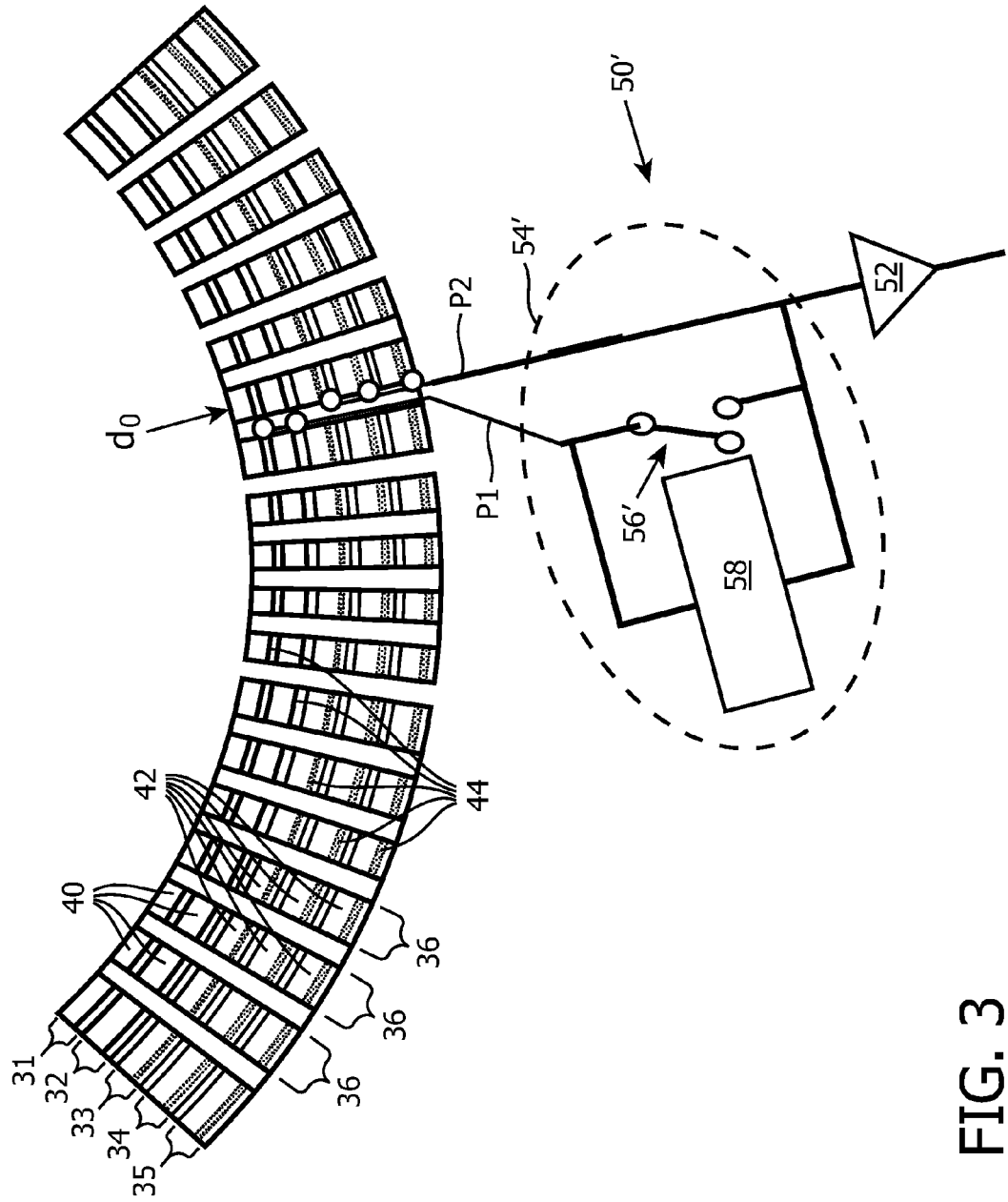

With brief reference to FIGS. 2 and 3, the CT detector 20 comprises a plurality of CT detector array layers. In the illustrated embodiment there are five CT detector array layers 31, 32, 33, 34, 35, but more generally the number of CT detector array layers can be one, two, three, four, five, six, seven, or more. For spectral CT the number of CT detector array layers is at least two. The CT detector array layers 31, 32, 33, 34, 35 are divided into detector elements 36 (sometimes referred to herein as "dixels"; only three of the dixels shown are labeled in FIGS. 2 and 3). Diagrammatic FIGS. 2 and 3 show 18 dixels 36; however, the number of dixels may be substantially higher, for example 512 dixels per detector module. Although a linear array of dixels 36 along the arc is shown in the diagrammatic side views of FIGS. 2 and 3, the CT detector array layers may in general be two-dimensional, e.g. broken into Y×Z dixels. Multiple detector modules can be used along the arc or transverse to the arc in order to provide a larger CT detector area. Optionally, dixels may be of different sizes across the arc or array. In some embodiments, each dixel comprises a scintillator element 40, 42 optically coupled with a corresponding photodetector 44. The scintillator element 40, 42 of a dixel may optionally comprise a one- or two-dimensional array of two or more scintillator elements (for example to provide increased length or area), and similarly the photodetector 44 of each dixel may optionally comprise a linear or two-dimensional array of photodetectors. The scintillator element 40, 42 is chosen to generate light responsive to impingement of x-rays, which light the optically coupled photodetector 44 detects to generate an electrical voltage or current output signal. If the dixel includes a linear or two-dimensional array of detector elements, they are suitably electrically interconnected, for example in parallel, to define a single electrical output channel for the dixel. In some embodiments, the photodetectors are photodiodes or photodiode arrays. Other optical detectors, such as silicon photomultiplier (SiPM) elements, are also contemplated. For spectral CT, the CT detector array layers 31, 32, 33, 34, 35 may optionally include layers providing at least two different spectral responses. The scintillator may include a host material such as, by way of some illustrative examples, oxides, nitrides and oxinitrides, halides, oxihalides, chalcogenides, or oxichalcogenides, in which the host material is doped with ions which generate emission with emission decay times less than about 500 µs. Examples of such ions include $Ir^{3+}$, $Ce^{3+}$, $Pr^{3+}$, $Eu^{2+}Tl^+$, $Na^+$. The scintillator material may also be self-activated. The compounds may also have more than one kind of metal ions in the unit cell, as the case of in the lanthanide aluminates, or more than one positive ions in the unit cell, as in the case of borates. Likewise, the scintillating materials might have more than one negative ion in the unit cell, as in the case of in the case of a lanthanide oxi sulfide. Solid solutions are also contemplated. Additional dopants, for example to reduce the afterglow or to increase the light yield or the radiation hardness, are also contemplated for inclusion as well.

To provide different spectral responses (for spectral CT applications by way of example in the illustrative example the two innermost CT detector array layers 31, 32 (that is, the two CT detector array layers 31, 32 that are relatively closer to the imaging region 18) include scintillators 40 comprising a scintillator material with a relatively low-Z value and a relatively low density. Most preferably, the Z-value is smaller than 40 and the density lower than 5 g/ml. Preferably, the Z-value is smaller than 40, but the density can also be higher than 5.0 g/ml. Some suitable scintillator materials of this type include the following host lattices and activators: Zinc selenide (ZnSe: Te,Zn); $(M1_x, M2_{(3-x)})$ $(M3_y, M4_{(5-y)})$. $O_{12}$ (where M1=Y, Gd, Lu; M2=Y, Gd, Lu; M3=Al, Sc, Ga, M4=Al, Sc, Ga,) doped with $Ce^{3+}$ or $Pr^{3+}$ and solid solutions thereof with Z smaller than 40; $M1_2M_2(X1,X2)_5$ doped with $Ce^{3+}$, $Pr^{3+}$ or $Eu^{2+}$ (where M1=Ca, Sr, Ba; M2=Li, Na, K, Rb, Cs; X1=F, Cl, Br, I; X2=F, Cl, Br,I) and solid solutions thereof with Z smaller than 40 wherein Z is the effective atomic number of the formulation; $(M1,M2)(X1,X2)_2$ doped with $Eu^{2+}$, $Ce^{3+}$ or $Pr^{3+}$, (where M1=Ca, Sr, Ba; M2=Ca, Sr, Ba; X1=F, Cl, Br, I; X2=F, Cl, Br, I) and solid solutions thereof, with Z smaller than 40; $Ln(X1,X2)_3$:Ce, (where Ln=Y, La, Gd, Lu; X1=F, Cl, Br, I; X2=F, Cl, Br,I) and solid solutions thereof, with Z smaller than 40; $Ln(X1,X2)_3$:Pr, (where Ln=Y, La, Gd, Lu; X1=F, Cl, Br, I; X2=F, Cl, Br,I)) and solid solutions thereof, with Z smaller than 40; $(Ln1,Ln2)O(X1,X2)$:Ce (where Ln1=Y, La, Gd, Lu; Ln2=Y, La, Gd, Lu; X1=F, Cl, Br, I; X2=F, Cl, Br, I) and solid solutions thereof, with Z smaller than 40; $(Ln1,Ln2)OX$:Pr (where Ln1=Y, La, Gd, Lu; Ln2=Y, La,Gd,Lu; X1=F, Cl, Br, I; X2=F, Cl, Br,I) and solid solutions thereof, with Z smaller than 40; $(Ln1,Ln2)AlO_3$:Ce and $LnAlO_3$:Pr (where Ln1=Y, La, Gd, Lu; Ln2=Y,La,Gd,Lu) and solid solutions, with Z smaller than 40; $(M1,M2)_2O_2S$:Pr (where Ln1=Y, La, Gd, Lu; Ln2=Y, La, Gd, Lu) with Z smaller than 40; $(Ln1,Ln2)_2SiO_5$:Ce and $Ln_2SiO_5$:Pr (where Ln1=Y, La, Gd, Lu; Ln2=Y, La, Gd, Lu) and solid solutions of these compositions, with Z smaller than 40; or $(Ln1,Ln2)_2Si_2O_7$:Ce, $Ln_2Si_2O_7$:Pr (where Ln1=Y, La, Gd, Lu; Ln2=Y, La, Gd, Lu) and solid solutions of these compositions, with Z smaller than 40.

The three outermost CT detector array layers 33, 34, 35 (that is, the three CT detector array layers 33, 34, 35 that are relatively further away from the imaging region 18) include scintillators 42 for which the Z-value is preferably larger than 40 and the density most preferably higher than 5 g/ml. Preferably, the Z-value is larger than 40, but the density also be lower than 5.0 g/ml. Some suitable scintillator materials of this type include the following host lattices and activators: cadmium tungstate (CWO) or other tungstate powder; NaI:Tl; CsI:Tl; CsI:Na; $(M1,M2)_3(M3,M4)_5O_{12}$ (where M1=Lu, Gd Y,; M2=Lu, Gd Y,; M3=A1, Sc, Ga, M4=Al, Sc, Ga, M3≠M4) doped with $Ce^{3+}$ or $Pr^{3+}$ and solid solutions thereof with Z larger than 40; $M1_2M2(X1,X2)_5$ doped with $Ce^{3+}$, $Pr^{3+}$or $Eu^{2+}$ (where M1=Ca, Sr, Ba; M2=Li, Na, K, Rb, Cs; X1=F, Cl, Br, I; X2=F, Cl, Br,I) and solid solutions thereof with Z larger than 40;$(M1,M2)(X1,X2)_2$ doped with $Eu^{2+}$, $Ce^{3+}$ or $Pr^{3+}$, (where M1=Ca, Sr, Ba; M2=Ca, Sr, Ba; X1=F, Cl, Br, I; X2=F, Cl, Br,I)) and solid solutions thereof, with Z larger than 40; $Ln(X1,X2)_3$:Ce, (where Ln=Y, La, Gd, Lu; X1=F, Cl, Br, I; X2=F, Cl, Br,I) and solid solutions thereof, with Z larger than 40; $Ln(X1,X2)_3$:Pr, (where Ln=Y, La, Gd, Lu; X1=F, Cl, Br, I; X2=F, Cl, Br,I) and solid solutions thereof, with Z larger than 40; $(Ln1,Ln2)O(X1,X2)$:Ce (where Ln1=Y, La, Gd, Lu; Ln2=Y, La, Gd, Lu; X1=F, Cl, Br, I; X2=F, Cl, Br,I) and solid solutions thereof, with Z larger than 40; (Ln1,Ln2)OX:Pr (where Ln1=Y, La, Gd, Lu; Ln2=Y, La, Gd, Lu; X1=F, Cl, Br, I; X2=F, Cl, Br,I) and solid solutions thereof, with Z larger than 40; (Ln1,Ln2)AlO$_3$:Ce and LnAlO$_3$:Pr (where Ln1=Y, La, Gd, Lu; Ln2=Y, La, Gd ,Lu) and solid solutions with Z larger than 40; (M1,M2)$_2$O$_2$S:Pr (where Ln1=Y, La, Gd, Lu; Ln2=Y, La, Gd, Lu) with Z larger than 40; (Ln1,Ln2)$_2$SiO$_5$:Ce and Ln$_2$SiO$_5$:Pr (where Ln1=Y, La, Gd, Lu; Ln2=Y, La, Gd, Lu) and solid solutions of these compositions, with Z larger than 40; or (Ln1,Ln2)$_2$Si$_2$O$_7$:Ce, Ln$_2$Si$_2$O$_7$:Pr (where Ln1=Y, La, Gd, Lu; Ln2=Y, La, Gd, Lu) and solid solutions of these compositions, with Z smaller than 40.

In all the formulations above, doping with more than one dopant is expressly included as for example Gd$_2$O$_2$S:Ce,Pr,F which is doped with both Ce and Pr.

It is also contemplated to use wavelength shifters to optimally adapt the X-ray generated emission to the spectral response of one or more photodetectors.

In some embodiments the scintillating powder is selected or prepared with a chosen morphology. By way of example, scintillators with cubic, prismatic, or hexagonal crystal form (such as GOS and ZnSe) advantageously can be formed into powders having a chunky morphology of relatively large, relatively isotropic grains which reduces scatter of the emitted scintillation light and assists outward transfer of the light. On the other hand, scintillators which form powders with highly anisotropic (that is, flaky two-dimensional or rod-like one-dimensional) grains tend to introduce light scattering and hence exhibit less efficient outward transfer of scintillation light.

The layers may be of unequal thickness, indeed of graded thickness. In some spectral CT embodiments it is contemplated to use the same scintillator material in all layers, and to rely for spectral differentiation on the spatial distribution of absorption of x-rays in the various CT detector array layers. For example, if the CT detector array layers 31, 32, 33, 34, 35 all use scintillators with the same scintillator material, the inner layers are dimensioned to stop the lower-energy x-rays such that the outer layers detect primarily higher energy x-rays that are not stopped by the inner layers.

Grading the thickness of the layers may also be utilized to reduce the number of layers needed, and thus the cost. The upper layers may be relatively thin, and designed to match the spectral distribution of the incident x-rays so that their signal is of similar size to that from thicker layers below, which must absorb the residual, more energetic, x-rays. The bottom layer is advantageously thicker than the others, to collect all the residual x-rays and avoid wasting patient dose.

Figure 4:
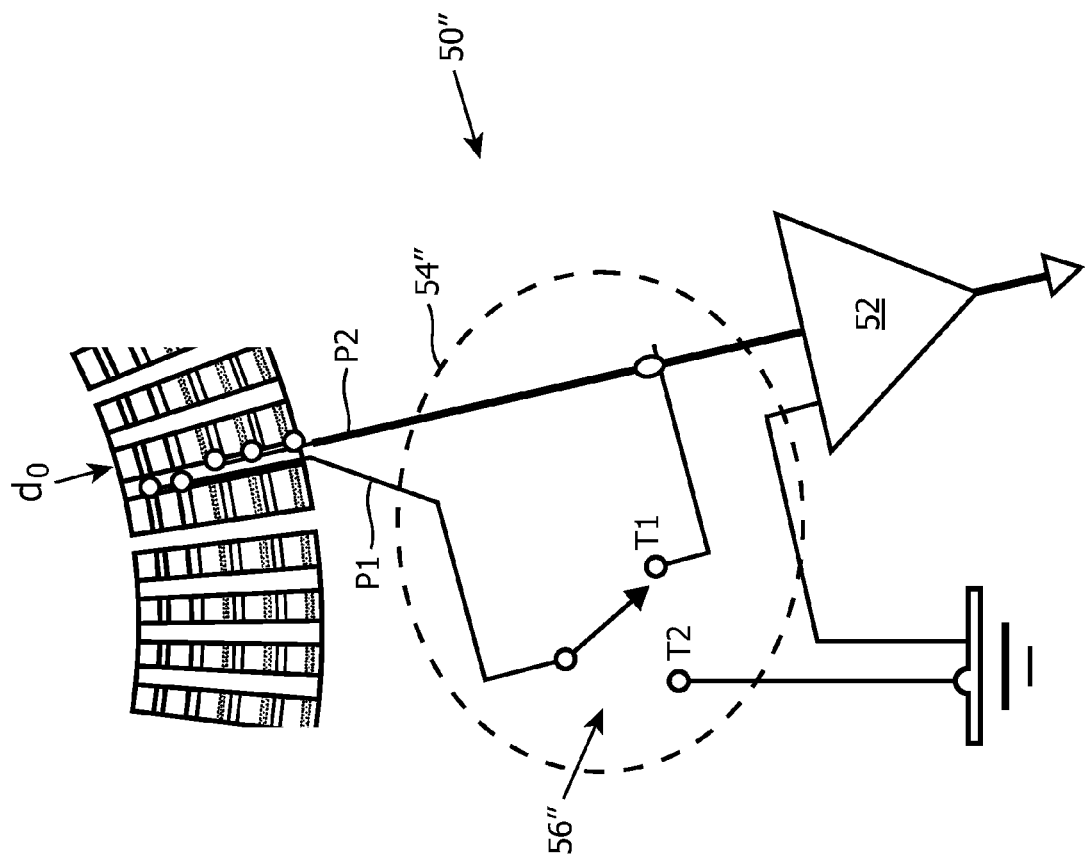

With reference to FIGS. 2-4, the CT detector 20 further includes detector element electronic channels, of which one detector element channel 50 for one dixel d$_0$ is depicted in FIG. 2, and alternative detector element channel embodiments 50', 50" for the dixel d$_0$ are depicted in respective FIGS. 3 and 4. The detector element channel embodiments 50, 50', 50" each include: a preamplifier 52; and switching circuitry 54, 54', 54" having (i) a first operational mode in which the preamplifier 52 is operatively connected with at least detector elements of the first sub-set of detector array layers 31, 32 and (ii) a second operational mode in which the preamplifier is operatively connected with at least detector elements of the second sub-set of detector array layers 33, 34, 35.

Although FIGS. 2-4 illustrate the alternative detector element channel embodiments 50', 50" for the illustrative dixel d$_0$, it is to be understood that a corresponding detector element channel is provided for each dixel 36 of the CT detector array 20. Moreover, it is to be further understood that in an actual implementation the photodiode signals are typically taken off a side edge (or side edges) or off the backside of a chip, hybrid circuit substrate, printed circuit, or other unit defining the array of photodetectors 44.

In the embodiments of FIGS. 2-4, the switching circuitry includes a first path P1 that electrically connects with an electrically parallel combination (shown diagrammatically by open circles in FIGS. 2-4) of the detector elements of the first sub-set of detector array layers 31, 32 of the dixel d$_0$. The switching circuitry also includes a second path P2 that electrically connects with an electrically parallel combination (shown diagrammatically by open circles in FIGS. 2-4) of the detector elements of the second sub-set of detector array layers 33, 34, 35 of the dixel d$_0$. Accordingly, the path P1 carries the parallel-combined signals of the detector elements of the first sub-set of detector array layers 31, 32 of the dixel d$_0$, while the path P2 carries the parallel-combined signals of the detector elements of the second sub-set of detector array layers 33, 34, 35 of the dixel d$_0$.

For the three illustrated detector element channel embodiments 50, 50', 50", the first operational mode operatively connects both paths P1, P2 in parallel to the preamplifier 52. In the three illustrated embodiments 50, 50', 50", the switching circuitry 54, 54', 54" continuously electrically connects the second path P2 with the preamplifier 52, so that to implement the first operational mode the switching circuitry 54, 54', 54" switches the first path P1 to connect with the preamplifier 52 in parallel with the second path P2. In the switching circuitry 54 the first operational mode is implemented when switch 56 is closed. In the switching circuitry 54' the first operational mode is implemented when switch 56' is closed. In the switching circuitry 54" the first operational mode is implemented when toggle switch 56" is continously connected with terminal T1.

In the embodiment of FIG. 2, the second operational mode of the switching circuitry 54 operatively connects only the detector elements (for dixel d$_0$) of the second sub-set of detector array layers 33, 34, 35 with the preamplifier 52. The second operational mode is implemented when the switch 56 is open, so that only the path P2 is connected with the preamplifier 52.

With reference to FIG. 3, the second operational mode of the switching circuitry 54' operatively connects the detector elements (for dixel d$_0$) of the second sub-set of detector array layers 33, 34, 35 with the preamplifier 52 and, in parallel, also connects the detector elements (for dixel d$_0$) of first sub-set of detector array layers 31, 32 with the preamplifer 52 through an attenuator 58. The second operational mode is implemented when the switch 56' is open, so that the signal from the parallel-connected detector elements (for dixel d$_0$) of the first sub-set of detector array layers 31, 32 passes through the attenuator 58 and feeds into the preamplifier 52 in parallel with the unattenuated second path P2.

With reference to FIG. 4, the second operational mode of the switching circuitry 54" operatively connects the detector elements (for dixel d$_0$) of the second sub-set of detector array layers 33, 34, 35 with the preamplifier 52 and, in parallel, also connects the detector elements (for dixel d$_0$) of first sub-set of detector array layers 31, 32 with the preamplifier 52 through an attenuator that is implemented by toggling the toggle switch 56" between terminal T1 and terminal T2 so as to implement a pulse modulation mode with a modulation level that defines the gain or attenuation level. The approach of FIG. 4 is well-suited for embodiments in which the photodetectors 44 are current sources, because in the embodiment of FIG. 4 the first path P1 is always (neglecting any switching time for the toggle switch 56") connected with a current sink, namely either the preamplifier 52 (in the case of connection with terminal T1) or electrical ground (in the case of connection with terminal T2).

Figure 5:
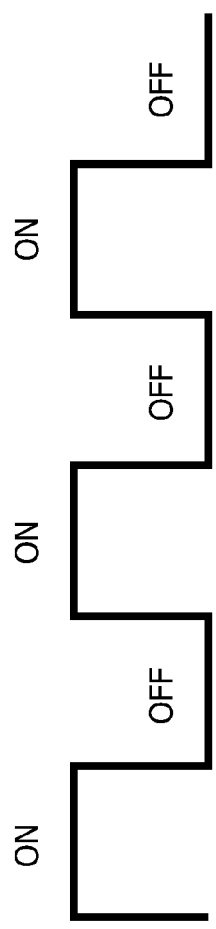
FIGS. 5 and 6 illustrate alternative switching modes suitably implemented by the CT detectors of FIGS. 2-4 to implement spectral CT imaging.

With brief reference to FIG. 5, the pulse modulation mode employed in the second operational mode of the detector element channel 50" of FIG. 4 can employ any suitable pulse modulation scheme, such as pulse width modulation (PWM), pulse frequency modulation (PFM), pulse code modulation (PCM), or so forth. In illustrative FIG. 5, PWM is employed with a duty cycle of 50% so as to provide an attenuation of 0.5. In FIG. 5 the label "ON" corresponds to the toggle switch 56" being connected with the terminal T1 while the label "OFF" corresponds to the toggle switch 56" being connected with the terminal T2. More generally, for PWM the attenuation is proportional to the duty cycle. By way of example, if the duty cycle is 10% (that is, the toggle switch 56" is connected with the terminal T1, i.e. "ON", 10% of the time) then the signal is attenuated to 10% of its unattenuated level, or said another way the gain is 0.1.

FIGS. 2-4 illustrate detector element channel embodiments 50, 50', 50" as illustrative examples. In general, the first sub-set and/or the second sub-set of detector array layers may include as few as a single detector array layer. Moreover, while in the illustrated embodiments the first sub-set of detector array layers 31, 32 comprise the low energy scintillators and the second sub-set of detector array layers 33, 34, 35 comprise the high energy scintillators, in other embodiments this arrangement may be reversed. Still further, it is contemplated to have three or more sub-sets of detector array layers (variant embodiment not shown) with each sub-set of detector array layers having a different spectral sensitivity.

With reference back to FIG. 1, the switching circuitry 54, 54', 54" enables acquisition of CT imaging data using the low energy (e.g., low-Z) detector array layer sub-set 31, 32 and/or the high energy (e.g., high-Z) CT detector array layer sub-set 33, 34, 35 so as to implement spectral CT. Toward this end, a CT controller 60 includes spectral CT switching control that operates the switching circuitry 54, 54', 54" of the CT detector array 20 to selectively acquire CT imaging data with at least two different spectral sensitivities. In the illustrated embodiments, the first operational mode CT imaging data are acquired using both the low energy (e.g., low-Z) detector array layer sub-set 31, 32 and the high energy (e.g., high-Z) CT detector array layer sub-set 33, 34, 35, while in the second operational mode CT imaging data are acquired using either the high energy (e.g., high-Z) CT detector array layer sub-set 33, 34, 35 alone (as in the channel embodiment 50 of FIG. 2) or using a combination of the high energy (e.g., high-Z) CT detector array layer sub-set 33, 34, 35 and an attenuated signal from the low energy (e.g., low-Z) detector array layer sub-set 31, 32 (as in the channel embodiments 50', 50" of FIGS. 3 and 4). If imaging data corresponding to the low energy (e.g., low-Z) CT detector array is desired, this can be generated by subtracting data acquired using the second operational mode (which includes only the high energy signal) from corresponding data acquired using the first operational mode (which additively combines the low and high energy signals).

With continuing reference to FIG. 1, a spectral CT image reconstruction and display module 62 reconstructs spectral CT images using the acquired spectral CT imaging data. For example, in some embodiments the spectral CT image reconstruction and display module 62 reconstructs: (1) a high energy image reconstructed from data acquired using the second operational mode (corresponding to high energy spectral response) and (2) a low energy image reconstructed from data acquired using the first operational mode (corresponding to additive combination of low and high energy spectral responses) minus data acquired using the second operational mode (corresponding to high energy spectral response). The high energy and low energy images can be displayed side-by-side, or fused (e.g., by subtracting one image from the other image), or otherwise manipulated to highlight spectral image content. In some approaches, image fusion may be performed by employing one image as a color overlay respective to the other image.

With continuing reference to FIG. 1, the CT controller 60 and the spectral CT image reconstruction and display module 62 are suitably embodied by a digital processing device such as an illustrated computer 70 that includes a display 72 for displaying the spectral CT images and a keyboard 74 or other user input device via which a user can control the CT imaging system. In the illustrated embodiment, a unitary computer 70 is shown by way of illustrative example; more generally, the processing components may be variously embodied, such as by dedicated digital CT control electronics in operative communication with a user terminal or other user interfacing device, or by a network-based server programmed to perform CT control and/or image reconstruction, or so forth.

Figure 6:
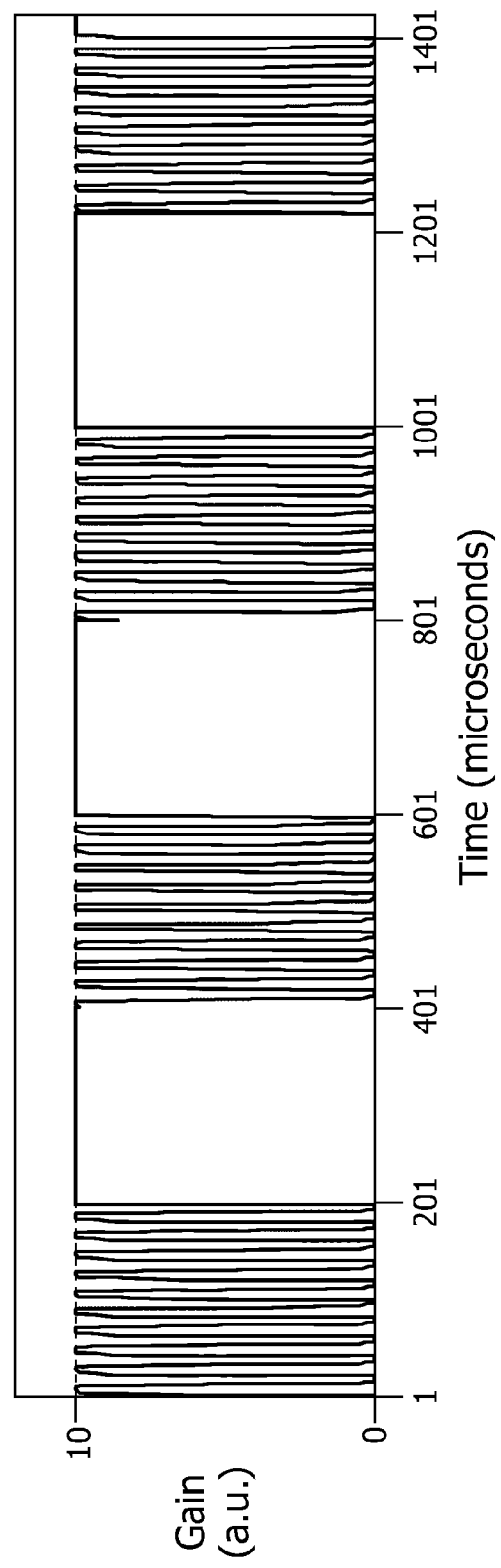

With brief reference to FIG. 4 and with further reference to FIG. 6, an illustrative CT imaging data acquisition sequence is shown using the channel embodiment 50" of FIG. 4. In the readout of FIG. 6, the first operational mode is active during time intervals 201-400 µs, 601-800 µs, 1001-1200 µs, and so forth. The second operational mode is active during the intervening time intervals 1-200 µs, 401-600 µs, 801-1000 µs, 1201-1400 µs, and so forth. As seen in FIG. 6, the second operational mode employs the 50% duty cycle PWM of FIG. 5.

The time frames of FIG. 6 are illustrative examples, and are suitably adjusted based on the gantry rotation speed and number of views per 360° rotation (which translates into the integration period or view time bin) and the number of cycles of each operational mode that is desired per view. In general, the switching between the first and second operational modes is performed a few times, e.g. 10 times in some embodiments, during each angular view (or, angular view bin in the case of continuous rotation of the gantry 14), which provides averaging out of signal variations during the view but is not so fast as to require substantially increased bandwidth of amplifiers 52, with increased noise.

For the embodiment of FIG. 6, the signal during the first operational mode is suitably denoted $A=S_H+S_L$ where $S_H$ denotes the signal from the high energy detector elements of the second sub-set of detector array layers 33, 34, 35 and $S_L$ denotes the (unattenuated) signal from the low energy detector elements of the first sub-set of detector array layers 31, 32. The signal during the second operational mode is suitably denoted $B=S_H+0.5 \cdot S_L$ where the factor 0.5 denotes the 50% attenuation provided by the PWM operating at 50% duty cycle (as per FIG. 5). The high and low energy signals $S_H$, and $S_L$ can be extracted from the first and second operational mode signals A and B to yield $S_H=2B-A$ and $S_L=2A-2B$. Similar expressions are readily derived for other attenuation levels.

An advantage of the various detector element channel embodiments 50, 50', 50" of FIGS. 2-4 is that they provide the CT detector array 20 with low cost detector electronics that provide spectral CT capability. The switches 56, 56', 56" are suitably embodied by transistors or other suitable discrete or integrated circuit (IC) switching components. For the toggle switch 56", a suitable embodiment employs a fast switch in which one pole connects the photodiode 44 to electrical ground and the other pole connects the photodiode 44 to the input of the preamplifier 52. This ensures that the photodiode is not left floating (that is, unconnected), but rather is kept in communication with a current sink (either ground or the preamplifier 52). It is also contemplated to employ photodiodes or phototransistors as the switches 56, 56', 56", in which case switching between the first and second operational modes can be controlled optically via optical fibers or other optical inputs. The disclosed approaches also have the advantage of halving the number of amplifiers as compared with spectral CT systems in which a preamplifier is provided for each spectral channel.

With returning reference to FIG. 2 (by way of illustrative example), the CT detector 20 includes a stack of CT detector array layers, namely two proximate CT detector layers 31, 32 comprising low-Z scintillators 40 viewed by photodetectors 44, and three distal CT detector layers 33, 34, 35 comprising high-Z scintillators 42 viewed by photodetectors 44. In some embodiments, the photodetectors 44 are embodied by thin circuits defining photodiodes or other photodetectors, as disclosed by way of example in Levene et al., U.S. Pub. No. 2008/0253507 A1 published Oct. 16, 2008 and incorporated herein by reference in its entirety. In some embodiments, the scintillators 40, 42 are embodied as a powdered scintillator disposed in a host resin, as disclosed by way of example in Levene et al., WO 2009/083852 A2 published Jul. 9, 2009 and incorporated herein by reference in its entirety. In some embodiments, the stacking of the CT detector array layers 31, 32, 33, 34, 35 to form the CT detector array 20 includes aligning corresponding optical detectors of the photodetector layers 44 of the plural CT detector array layers 31, 32, 33, 34, 35 to form detector elements, or "dixels" each of which comprises a stack of aligned photodetectors with intervening scintillators.

It is recognized herein that a substantial factor in the cost and complexity of manufacturing CT detector layers employing a powdered scintillator in a resin or plastic host lies in the curing operation, which is either very slow (e.g., when curing is performed at a low curing temperature) or employs relatively high temperatures obtained by the use of a suitable furnace or other heat source. The high curing temperature may also dictate thermal management measures such as use of a controlled ambient (e.g., nitrogen or forming gas) in the furnace during the curing. The heating can also introduce thermal stresses, for example at interfaces between materials with mismatched coefficients of thermal expansion. Still further, the size and dimensions of the scintillator element are limited by the capacity of the furnace, and processing throughput is limited by furnace loading and unloading operations.

An improved approach is disclosed herein, in which an optically curable resin is used as the host for the scintillator material. As used herein, the term "optical curing" is intended to encompass curing using visible, violet, or ultraviolet (uv) light. In illustrative embodiments disclosed herein by way of example, the optical curing is performed using an ultraviolet light source such as a mercury lamp or other ultraviolet lamp. By using optically (e.g., uv) curable resin, a scintillator element comprising uncured scintillator material is formed, and the scintillator element comprising the uncured scintillator material is optically cured to generate a scintillator element comprising cured scintillator material. The optical curing process does not involve heating, which facilitates numerous further improvements. For example, the elimination of the furnace improves process uniformity, which is advantageous in CT detector manufacture. It improves throughput substantially, and automated processes such as continuous extrusion processing can be used. Thus, rapid optical curing at low temperature (for example, at room temperature) lends itself to the use of a continuous process, such as extrusion, to form a continuous strip of scintillation tape which may afterwards be assembled, using an optical adhesive, onto a printed photodiode array.

In some embodiments, the scintillator 40, 42 is formed directly onto the array of photodetectors 44. In some such embodiments the photodetectors 44 are in the form of a flexible array or other suitable substrate. Another advantage is that it is recognized herein that optically curable resins or plastics tend to be resistant to yellowing under later irradiation. Yet another advantage is that this method allows printing of scintillator layers, for example by using inkjet procedures.

Figure 7:
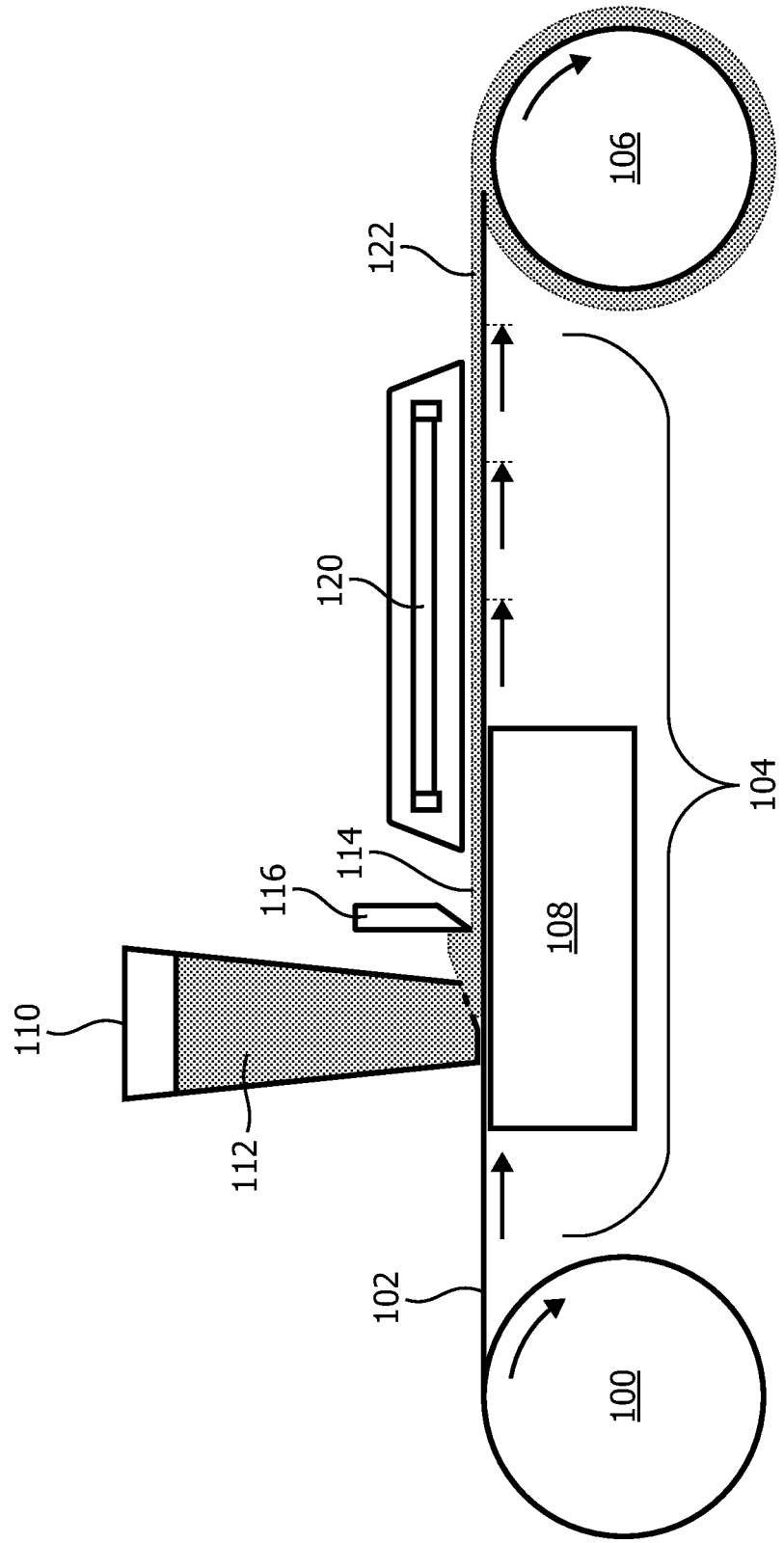
FIGS. 7-9 illustrate alternative manufacturing systems for manufacturing the scintillators of the CT detectors of FIGS. 1-4.
Figure 8:
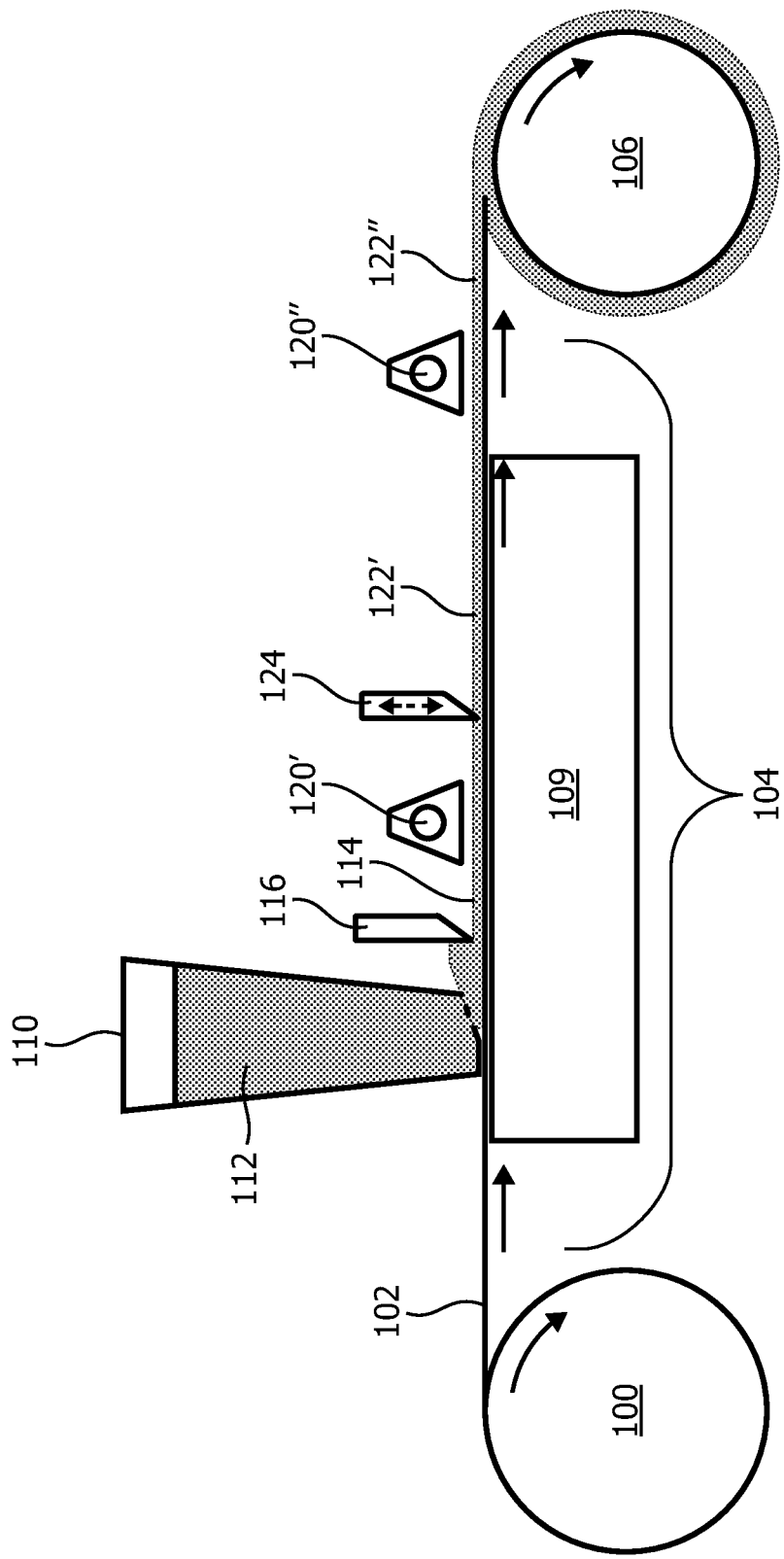

With reference to FIGS. 7 and 8, complementary approaches for reducing CT detector manufacturing cost are set forth, which integrate well with the spectral CT provided by the switching circuits 54, 54', 54" of FIGS. 2-4. The manufacturing approach of FIGS. 7 and 8 have a number of common elements. Both approaches employ a reel-to-reel process in which a source reel 100 supplies a flexible photodiode array 102, for example on a polyethylene terephthalate (PET or PETE) tape or other plastic tape or other flexible support. It is not necessary that the photodiode array be formed on an expensive plastic tape, that withstands high temperature, such as a polyimide tape, because the uv-curing process does not involve heating of the photodiode array. The photodetectors 44 of the CT detector array 20 suitably comprise the photodiodes of the flexible photodiode array 102 (with suitable electrical interconnections established). In the reel-to-reel process, the flexible photodiode array 102 is unrolled from the source reel 100 and passes through a processing region 104 where it undergoes various processing, after which the processed flexible photodiode array 102 may be collected by a take-up reel 106 where it is stored for later use. Alternatively, the processed flexible photodiode array 102 may be cut into predetermined lengths as it is fed from the source reel 100 and stored as such predetermined lengths, such that the take-up reel 106 is omitted. In the illustrated embodiments, the flexible photodiode array 102 is supported or held flat in at least a portion of the processing region 104 by a planar support 108, 109 which may, for example, be a smooth flat granite surface plate or other suitably planar surface. The surface plate may be coated with a thin film of Teflon to reduce friction. Additionally or alternatively, the flexible photodiode array 102 may be suspended under tensile strain between rollers (not illustrated) or otherwise supported in the processing region 104.

With continuing reference to FIGS. 7 and 8, a hopper 110 or other source of uncured scintillator material 112 is arranged in the processing region 104 to feed a scintillator element 114 comprising uncured scintillator material onto the flexible photodiode array 102. In some embodiments the scintillator element 114 comprising uncured scintillator material is disposed on the flexible photodiode array 102 by an extrusion process, with the hopper 110 embodied by a suitable extruder apparatus such as a Brabender® extruder apparatus (available from Brabender® GmbH & Co. KG, Duisberg, Germany). In the embodiments of FIGS. 7 and 8, a precision-edge doctoring blade 116 cooperates with the granite surface plate 108, 109 to define a precise thickness for the scintillator element 114 comprising uncured scintillator material. By way of example, the doctoring blade 116 may define the thickness at 100 microns, although thinner or thicker values are also contemplated. (Note, the unit "micron" is also variously referenced in the art as "micrometer" or the symbol "μm").

In the embodiment of FIG. 7, the scintillator element 114 comprising uncured scintillator material is optically cured using an ultraviolet lamp 120, such as a medium pressure mercury arc lamp. This generates a scintillator element 122 comprising cured scintillator material disposed on the flexible photodiode array 102. The flexible photodiode array 102 with the scintillator element 122 comprising cured scintillator material disposed thereon may be taken up by the take-up reel 106 for storage and later use in constructing the CT detector array 20 of FIGS. 1-4.

In the embodiment of FIG. 7, the scintillator element 122 comprising cured scintillator material is continuous along the length of the reel-to-reel processing.

In the embodiment of FIG. 8, the ultraviolet lamp 120 of FIG. 7 is replaced by two ultraviolet lamps 120', 120" that are spaced apart along the direction of the reel-to-reel processing. The first ultraviolet lamp 120' is a "pre-curing" lamp that provides partial curing of the scintillator element so as to generate a partially cured, but still relatively soft, scintillator element with enhanced structural integrity (e.g., harder, higher viscosity, or so forth) as compared with the scintillator element 114 comprising uncured scintillator material. (Precuring is also advantageous in case of printing the scintillator layers using e.g. inkjet technology). This partially cured scintillator element is then scored by a dicing edge 124 which forms slots in the relatively soft partially cured scintillator element. The slots may pass completely through the scintillator film (so as to completely dice the film) or may be slots passing partway through the scintillator film, so as to facilitate complete separation to be performed later. Some suitable dicing edges include wheels (for forming slices), reciprocating dicing edges, high-speed rotating saws, laser knives, or so forth. By way of example, a reciprocating dicing edge may comprise a dicing knife that descends upon the relatively soft "green" pre-cured tape and displaces a line in it, leaving an inter-dixel (i.e., inter-detector element) gap. Operation of the dicing edge 124 is synchronized by a camera (not shown) or other sensor with the movement of the flexible photodiode array 102, so that the inter-dixel gaps formed in the scintillator element coincide with the inter-diode gap between diodes (or, more generally, between photodetector elements). The output of the reciprocating dicing edge 124 is a partially cured and periodically slotted scintillator element 122', which undergoes further curing performed by the second (e.g., "final curing") ultraviolet lamp 120" to generate the scintillator element 122" comprising cured scintillator material and having periodic slots due to the action of the reciprocating dicing edge 124.

Figure 9:
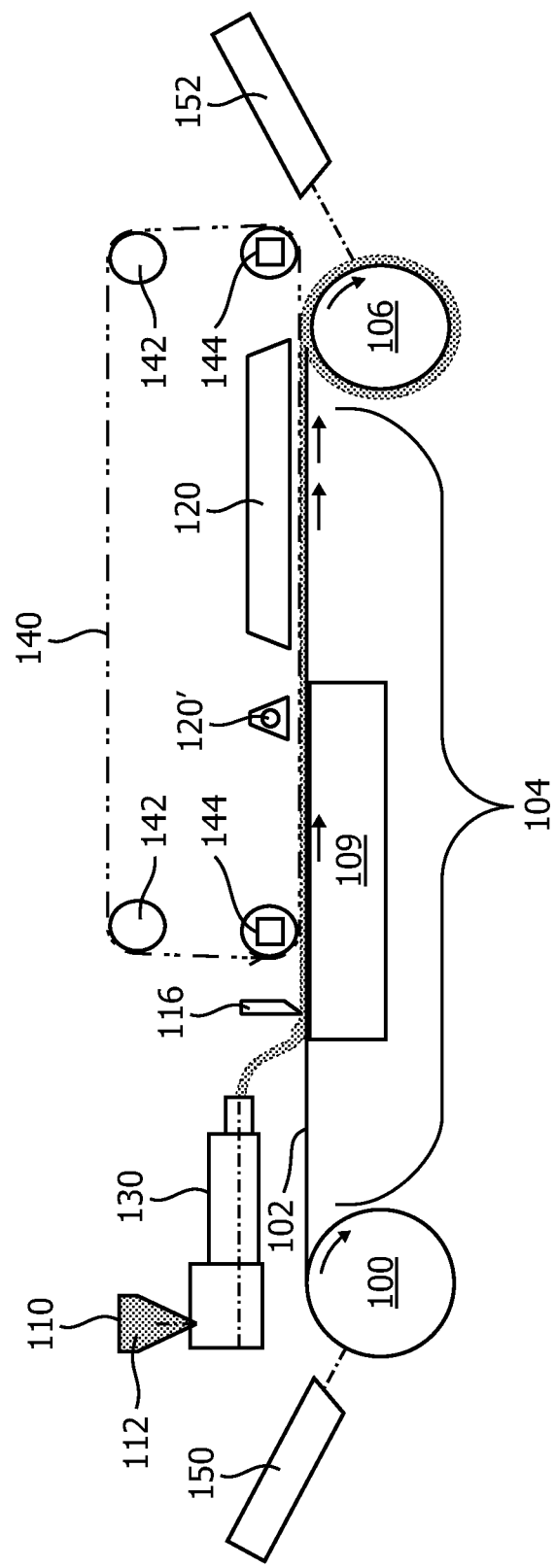

With reference to FIG. 9, another approach for forming a diced scintillator element during the reel-to-reel processing is described. The approach of FIG. 9 does not employ mechanical dicing, but rather uses an approach analogous to photolithography. The reel-to-reel processing system of FIG. 9 has some of the same components as the systems of FIGS. 7 and 8, including the source reel 100 and take-up reel 106 for moving the flexible photodiode array 102 through the reel-to-reel processing, the planar support 109, the hopper 110 or other source of uncured scintillator material 112, and the doctoring blade 116. The system of FIG. 9 also shows a paste extruder element 130, but this is optionally also employed in the systems of FIGS. 7 and 8. The system of FIG. 9 employs a different combination of ultraviolet lamps, namely the pre-curing ultraviolet lamp 120' of FIG. 8 followed by the elongated ultraviolet curing lamp 120 of FIG. 7.

In the system of FIG. 9, the dicing is performed by optical patterning using a shadow mask tape 140 that is driven in a closed loop by a set of uncontrolled upper rollers 142 and a set of controlled lower rollers 144. The shadow mask tape 140 is suitably made of PET tape with thin printed black lines defining the shadow mask.

Figure 10:
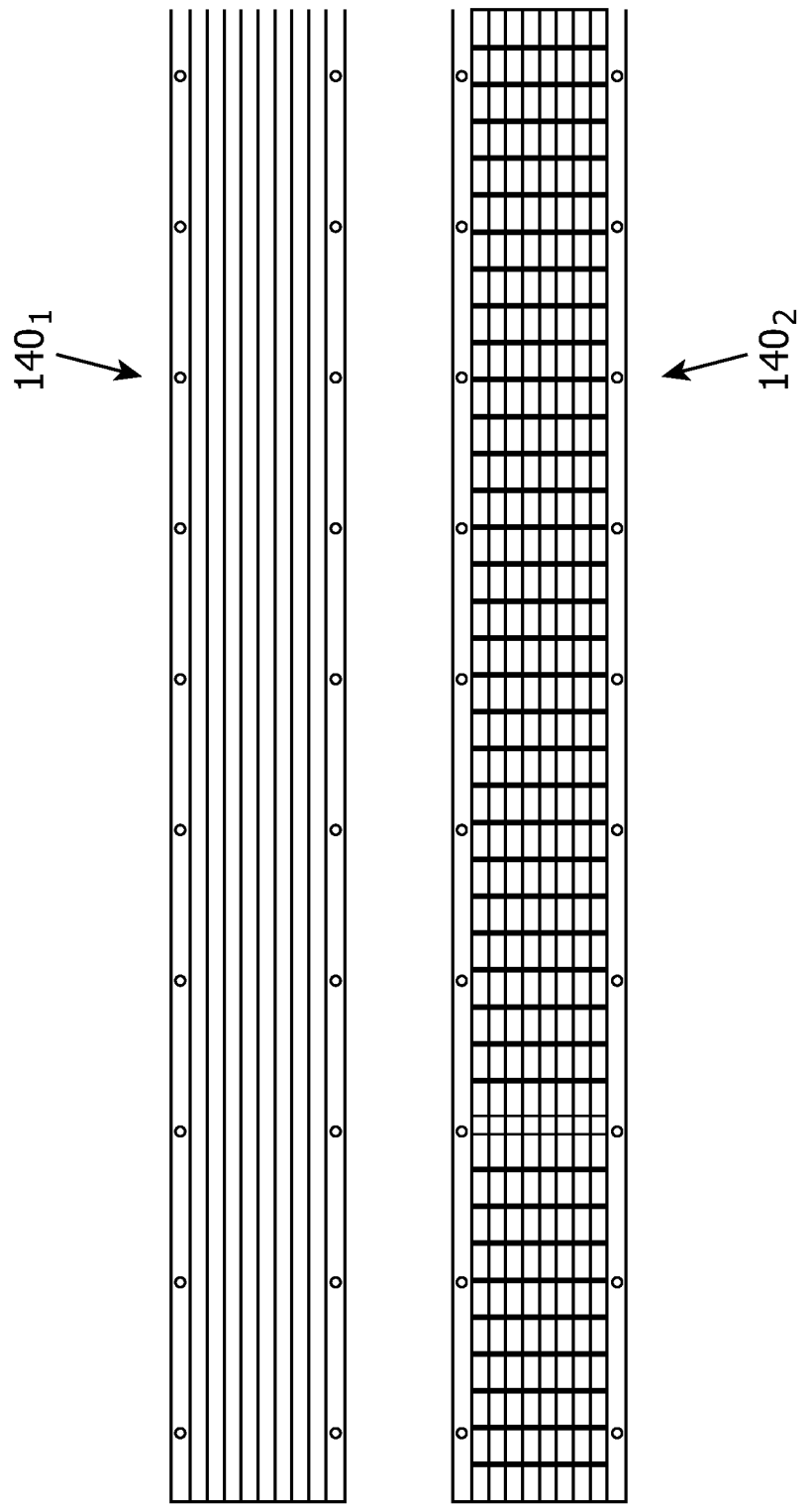
FIG. 10 illustrates some suitable shadow mask tapes for use in the manufacturing system of FIG. 9.

With brief reference to FIG. 10, a plan view of partial lengths of two suitable shadow mask tapes 140₁, 140₂ are shown. The shadow mask tape 140₁ is suitable for forming longitudinal dicing slots. The shadow mask tape 140₂ is suitable for forming both lateral and longitudinal dicing slots.

With returning reference to FIG. 9, the purpose of the roller system 142, 144 is to move the shadow mask tape 140 synchronously with the reel-to-reel processing movement of the flexible photodiode array 102. The shadow mask tape 140 is fed on the rollers 142, 144 above the green (i.e., uncured) scintillator element on the conveyor, immediately after the doctoring blade 116, as shown in FIG. 9, or in an optional alternative immediately after the pre-curing ultraviolet lamp 120' (alternative not shown). The shadow mask tape 140 tracks the source reel 100 in width, using suitable control of the controlled lower rollers 144 based on a suitable control signal such as detection of perforations along its edges, or using optical sensors such as a TV camera 150 with positional feedback to provide the control signal. The shadow mask tape 140 moves in synch with the scintillator element as it passes under the ultraviolet curing lamp 120, and the shadow mask tape 140 casts shadows of the black lines on the green scintillation tape beneath during the curing process. To avoid blurring due to edge diffraction, the shadow mask tape 140 should be positioned as close as practicable to the synched moving scintillator element. In some embodiments, the shadow mask tape 140 has sufficient slack in the rollers 142, 144 that the tape 140 actually sags and touches the green scintillator element. In such cases, it is advantageous to coat the shadow mask tape 140 with a thin layer (e.g., 1-5 micron) of PTFE to prevent wetting and dirtying of the scintillator element.

A high-definition "contact" (or near-contact) print is thus obtained, in which the scintillator element is optically cured except in those areas that were shadowed by the black lines of the shadow mask tape 140. The shadow mask tape 140 "shadows", and hence prevents curing of, the regions of the scintillator element directly beneath the black lines. As a result, the uncured resin portions may afterwards be washed away using an appropriate solvent so as to form the dicing lines. For mercaptan resins, acetone or iso-propanol IPA are suitable solvents. The dicing slots thus formed may be left empty, or alternatively may be filled with black or white paint to provide more effective optical isolation of the diced scintillator pixels and reduce cross-talk.

To form lateral dicing slots across the scintillator (e.g., using the shadow mask tape 140₂ of FIG. 10), the tracking precision provided by the roller system 142, 144 should track the movement of the flexible photodiode array 102 so as to coincide within a tight tolerance (e.g., better than 20 microns in some contemplated embodiments) so as to align the lateral dicing slots with the gaps between the optical detector pixels. One approach for achieving these tight tolerances is disclosed in Jamzadeh, U.S. Pat. No. 4,961,089 which is incorporated herein by reference in its entirety, and suitably uses optical cameras 150, 152 imaging the source and take-up reels 100, 106, respectively, as control signals.

FIGS. 7-9 illustrate processing to form a scintillator element 114 comprising uncured scintillator material on the flexible photodiode array 102, and optically curing same to generate a scintillator element 122, 122" comprising cured scintillator material. FIGS. 7-9 provide illustrative examples, and diverse variations are contemplated. For example, if the scintillator element 114 comprising uncured scintillator material has sufficient structural integrity, then the reciprocating dicing edge 124 of the embodiment of FIG. 8 can be included in the embodiment of FIG. 7 between the doctoring blade 116 and the ultraviolet lamp 120. While the dicing edge 124 is illustrated as a mechanical component, dicing using a suitable laser beam or other optical mechanism is also contemplated. The ultraviolet lamps 120, 120', 120" can be replaced by other ultraviolet light sources, and moreover it is contemplated to employ optical curing using light in a wavelength range other than the ultraviolet. Indeed, in some contemplated embodiments x-rays are used for the optical curing. Still further, processing operations unrelated to formation of the scintillator element 122, 122" are contemplated for inclusion in the reel-to-reel processing, such as processing operations intended to modify the photodiodes of the flexible photodiode array 102. Another processing operation contemplated to be performed as part of the reel-to-reel processing is lamination. As yet another contemplated modification, the reel-to-reel processing can be stepwise rather than continuous. For example, the reel movement may stop for a time interval chosen for performing the optical curing operation or the mechanical dicing.

Still further, the operations of forming a scintillator element comprising uncured scintillator material and optically curing the scintillator element comprising the uncured scintillator material to generate a scintillator element comprising cured scintillator material can be performed using other manufacturing apparatuses besides a reel-to-reel processing apparatus. In one contemplated variant, the scintillator element may be formed on a substrate other than the substrate supporting the photodetectors 44, and the finished (i.e., cured) scintillator element may then be assembled with the photodetectors 44 after the optical curing operation.

Having described some suitable manufacturing systems by way of example illustrated with reference to FIGS. 7-9, some suitable materials and material components suitable for use as the uncured scintillator material 112, and some suitable curing schedules, are next set forth.

In some suitable embodiments, the uncured scintillator material 112 is formed by combining a scintillator material powder, such as illustrative examples set forth herein for the scintillators 40, 42, and an uncured polymeric host, such as an uncured resin. In some embodiments the polymeric host is suitably an uncured cyanoacrylate resin such as Dymax 222, or an uncured UV-curing silicone resin such as Dymax 9440. A resin with higher refractive index, such as an uncured uv-curing acrylic resin or an uncured mercaptan resin, an uncured mercaptan-containing polymer, an uncured Mercapto-ester adhesive, an uncured plastic material, or so forth may also be used. The resin is preferably x-ray hard, and in some embodiments the resin is selected to have medium viscosity (around 1000 cP), so that after mixing with the scintillator powder at high concentration it is not too stiff to be extruded and at the same time is not too free-flowing to spread laterally upon the photodetector layer beneath. Optionally, a surfactant may also be combined therein to facilitate dispersal of the scintillator material powder in the uncured polymeric host. Some suitable surfactants include, by way of example, BYK-2155, BYK 430, (both available from BYK USA Inc., Wallingford, Conn., USA) or chemical equivalents thereof.

In one preparation approach set forth herein by way of illustrative example, the scintillator powder (GOS, by way of illustrative example) is pre-mixed with the surfactant (by way of illustrative example, BYK-2155 or BYK 430) to form a slurry that is then fed continuously into the extruder with the resin (by way of illustrative example, a Mercaptan resin such as NOA 63 or NOA 68, both available from Norland Products, Cranbury, N.J., USA). This latter operation is preferably done in a dark setting, because the ultraviolet light-curable resin typically has some sensitivity to visible light. A commercial extruder such as, by way of illustrative example, a Brabender KE 19/25 D extruder, serves as a suitable mixer. By way of illustrative example, some suitable surfactant-to-GOS powder ratios for a GOS powder having median particle size of 3.2 micron are: 8.94 wt-% of the GOS powder for BYK-2155; and 0.98 wt-% of the GOS powder for BYK-430.

Some illustrative ultraviolet light-curing schedules for the GOS scintillator powder-in-NOA resin are as follows. In this illustrative example, the scintillator element comprises a layer with a thickness of 250 micron and width of 64 millimeter that is extruded at a rate of 2.5 cm/sec. The system of FIG. 7 is used, with the ultraviolet lamp 120 having a length of 100 centimeters and operating at 240 watts/centimeter. At the 2.5 cm/sec extrusion rate, it follows that the reel-to-reel process will pass the extruded scintillator through the 100 centimeter length of the lamp 120 in 40 seconds, which is sufficient to perform ultraviolet light curing of the scintillator layer. Optionally, post-curing can be performed, for example as shown in the system of FIG. 8. Scintillator layers that are thicker than 250 micron may be preferable for the more distal layers (e.g., the layers 33, 34, 35 shown in FIGS. 2-3) because the more distal layers are intended to detect hard x-rays (that is, higher energy x-rays) that pass through the more proximate layers (e.g., the layers 31, 32 shown in FIGS. 2-3). For such layers, suitable process parameter adjustments can be made, such as increasing the optical power and/or length of the ultraviolet lamp 120, reducing the extrusion rate (so as to keep the scintillator element under the ultraviolet lamp 120 for a longer time), or so forth.

With reference to FIG. 11, light output (LO) values (with the background signal value B subtracted off) are shown for scintillator layers comprising cured scintillator material fabricated using 80 wt-% GOS scintillator powder in NOA 68 Mercaptan resin with 6 wt-% surfactant. FIG. 11 shows LO values for various thicknesses of the cured scintillator layer. For demonstration purposes, the experiments generating the graph of FIG. 11 were performed on a wedge-shaped cured scintillator layer (so as to provide the thickness variation corresponding to the abscissa of FIG. 11). The maximum light output for this 80% composition is achieved at a thickness of about 500 micron. Experiments performed for scintillators comprising GOS powders in ultraviolet light-cured NOA resin with GOS concentrations in the range 60-75 wt-% showed little variation in light output signal versus x-ray absorption when the GOS concentration is changed. X-ray absorption of greater than 40% was readily achievable with an 80 wt-% GOS concentration in ultraviolet light-cured NOA resin with a cured scintillator layer thickness of 450 microns. For scintillator layers with 40% x-ray absorption, six CT detector array layers is sufficient to absorb greater than 95% of the x-ray intensity. Optionally, the most distal CT detector array layer (e.g., the layer 35 in FIGS. 2 and 3) can be made thicker to ensure still more complete x-ray absorption.

An advantage of employing multiple CT detector layers is that each individual scintillator layer can be made thin, for example 1000 microns or thinner, or more preferably 500 microns or thinner. By using such thin layers, scattering losses due to refractive index mismatch are substantially reduced as compared with thicker scintillators. This in turn expands the range of suitable host resin materials. Accordingly, even for non-spectral CT embodiments it is useful to employ a multi-layer CT detector (optionally using the same scintillator material in all layers). It is contemplated for the most distal CT detector layer 35 to have a scintillator layer of greater thickness, e.g. greater than 1000 microns.

Another issue that can arise is resin fluorescence in response to x-rays. For example, Norland mercapto-ester resins emit weak fluorescent light at wavelengths between 350-420 nm. If this fluorescence emission is too slow to be incorporated in the CT signal, and also strong enough to degrade the signal, it should be suppressed or eliminated.

This can be done, for example, by: selecting optical detectors 44 such as CIGS photodiodes which have low sensitivity below 450 nm; or by including interference or absorbtion filters (not shown) in thin layers between the scintillator layer and the optical detectors 44; or by incorporating a blue-absorbing dye in the resin to absorb the blue emission.

The embodiments disclosed herein are illustrative examples, and numerous variants are contemplated. For example, it is contemplated to employ switching circuitry as as described herein with reference to FIGS. 2-6 in conjunction with CT detector layers employing scintillators comprising materials and manufacturing other than those described herein with reference to FIGS. 7-9. For example, the switching circuitry as described herein with reference to FIGS. 2-6 may be employed in conjunction with CT detector layers employing powdered scintillators in a resin or plastic that is cured by furnace heating, rather than by optical curing, or in conjunction with CT detector layers employing ceramic scintillators.

Moreover, it is contemplated to employ CT detectors comprising CT detector layers with scintillators formed as described with reference to FIGS. 7-9 and employing optical curing, but to omit the switching circuitry that is described herein with reference to FIGS. 2-6. Such CT detectors omitting the switching circuitry are suitable for non-spectral CT applications, or alternatively can be used for spectral CT applications in conjunction with alternative electronics such as electronics employing separate preamplifiers for the low energy and high energy channels.

This application has described one or more preferred embodiments. Modifications and alterations may occur to others upon reading and understanding the preceding detailed description. It is intended that the application be construed as including all such modifications and alterations insofar as they come within the scope of the appended claims or the equivalents thereof.

The invention claimed is:

1. A method of manufacturing comprising:
    feeding a flexible array of optical detectors from a source reel;
    disposing a scintillator layer comprising uncured scintillator material on the flexible array of optical detectors fed from the source reel; and
    optically curing the scintillator layer comprising the uncured scintillator material disposed on the flexible array of optical detectors to generate a scintillator layer comprising cured scintillator material disposed on the array of optical detectors.

2. The method of claim 1, wherein the feeding comprises:
    transferring a flexible array of optical detectors from a source reel to a take-up reel, the disposing and optical curing operations being performed during the transferring.

3. The method of claim 1, wherein the optical curing comprises:
    optically curing the scintillator layer comprising uncured scintillator material using ultraviolet light.

4. The method of claim 1, further comprising:
    prior to the disposing, forming the uncured scintillator material by combining a scintillator material powder and an uncured polymeric host.

5. The method of claim 1, further comprising:
    forming the uncured scintillator material by combining a scintillator material powder, an uncured polymeric host, and a surfactant.

6. The method of claim 4, wherein the scintillator material powder comprises non-flaky and non-rodlike grains.

7. The method of claim 4, wherein the uncured polymeric host comprises one or more uncured polymeric host materials selected from a group consisting of an uncured resin, an uncured epoxy resin, an uncured cyano-acrylate resin, an uncured acrylic resin, an uncured silicone resin, an uncured mercaptan resin, an uncured mercaptan-containing polymer, an uncured Mercapto-ester adhesive, and an uncured plastic material.

8. The method of claim 5, wherein the surfactant comprises one or more surfactant materials selected from a group consisting of BYK-2155, BYK 430, and chemical equivalents thereof.

9. The method of claim 1, further comprising:
    dicing or slotting the scintillator layer disposed on the flexible array of optical detectors such that the scintillator layer comprising cured scintillator material includes dicing or slots.

10. The method of claims 9, wherein the dicing or slotting is performed using a mechanical device.

11. The method of claims 9, wherein the dicing or slotting is performed using a shadow mask tape arranged to (i) travel synchronously with the flexible array of optical detectors as the flexible array of optical detectors is fed from the source reel and (ii) shadow selected regions of the scintillator layer from the optical curing.

12. The method of claim 1, wherein the flexible array of optical detectors comprises a flexible array of photodiodes.

13. The method of claim 1, wherein the feeding, disposing, and optical curing operations are repeated to generate a plurality of computed tomography (CT) detector array layers each comprising cured scintillator material disposed on an array of optical detectors, and the method further comprises:
    stacking the CT detector array layers to define a multi-layer CT detector array.

14. The method of claims 13, wherein the stacking includes aligning corresponding optical detectors of the plural CT detector array layers.

15. The method of claim 13, further comprising:
    electrically connecting a first sub-set of the CT detector array layers with a first electrical input path to spectral CT detector electronics; and
    electrically connecting a second sub-set of the CT detector array layers with a second electrical input path to the spectral CT detector electronics;
    wherein the spectral CT detector electronics have at least (i) a first operational mode in which the spectral CT detector electronics are operatively connected with at least the first electrical input path and (ii) a second operational mode in which the spectral CT detector electronics are operatively connected with at least the second electrical input path.

16. A scintillator layer comprising cured scintillator material manufactured by a method as set forth in claim 1.

17. A computed tomography (CT) detector array manufactured by a method as set forth in claim 1.

18. A computed tomography (CT) detector array comprising:

a stack of N detector array layers, each detector array layer comprising a scintillator layer comprising a scintillator material powder in a polymeric host disposed on an array of optical detectors;

wherein at least N-1 of the scintillator layers each have a thickness of 1000 microns or thinner.

19. The CT detector array as set forth in claim 18, wherein at least N-1 of the scintillator layers each have a thickness of 500 microns or thinner.

20. The CT detector array as set forth in claim 18, wherein each detector array layer comprises a scintillator layer disposed on a flexible array of optical detectors.

21. The CT detector array as set forth in claim 18, wherein the scintillator layers incorporate a blue-absorbing dye in the polymeric host to absorb blue fluorescence emission.

22. A computed tomography (CT) comprising a CT detector array made as described in claim 18.

23. A computed tomography (CT) detector array comprising:

a stack of detector array layers comprising a first sub-set of detector array layers having a first spectral response and a second sub-set of detector array layers having a second spectral response different from the first spectral response; and detector element channels each including a preamplifier and switching circuitry having (i) a first operational mode in which the preamplifier is operatively connected with at least detector elements of the first sub-set of detector array layers and (ii) a second operational mode in which the preamplifier is operatively connected with at least detector elements of the second sub-set of detector array layers.

24. The CT detector array as set forth in claim 23, wherein in the first operational mode the preamplifier is operatively connected in parallel with (1) detector elements of the first sub-set of detector array layers and (2) detector elements of the second sub-set of detector array layers.

25. The CT detector array as set forth in claim 23, wherein the switching circuitry continuously operatively connects the detector elements of the second sub-set of detector array layers with the preamplifier, and the switching circuitry further comprises:

a switching element by which the preamplifier is selectively operatively connected with the detector elements of the first sub-set of detector array layers.

26. The CT detector array as set forth in claim 25, wherein the switching element selectively operatively disconnects the detector elements of the first sub-set of detector array layers from the preamplifier.

27. The CT detector array as set forth in claim 25, wherein the switching element is configured to switch a gain or attenuation of an electrical path between the first sub-set of detector array layers and the preamplifier.

28. The CT detector array as set forth in claim 27, wherein in the switching element switches the gain or attenuation of the electrical path by pulse modulation.

29. A computed tomography (CT) system comprising:

a CT detector array as set forth in claim 22;

a CT controller configured to acquire (1) first CT imaging data using the CT detector array operating in the first operational mode and (2) second CT imaging data using the CT detector array operating in the second operational mode; and a spectral CT image reconstruction module configured to generate one or more CT images containing spectral information based on the first CT imaging data and the second CT imaging data.

* * * * *